United States Patent Office 2,971,029
Patented Feb. 7, 1961

2,971,029
STABILIZATION OF AROMATIC CARBOCYCLIC AMINES

Eugene V. Hort, Westfield, N.J., assignor to General Aniline & Film Corporation, New York, N.Y., a corporation of Delaware No Drawing. Filed June 21, 1956, Ser. No. 592,737

5 Claims. (Cl. 260—575)

This invention relates to the stabilization of aromatic carbocyclic amines against atmospheric oxidation and deterioration during storage.

It is well known in the chemical arts that aromatic amines are rapidly oxidized by contact with air. The combination of the aromatic amine and the oxidation products decreases the value of the aromatic amine, and as a consequence thereof, it cannot be employed in certain types of chemical reactions.

Aromatic amines and polyamines have a tendency to darken in color during storage, particularly at elevated temperatures. This oxidation or discoloration makes the aromatic amine or polyamine unsuitable as an intermediate for the manufacture of various azo dyes, chemical products and as curing or hardening agents for epoxy resins.

In order to overcome the foregoing shortcomings, it has been proposed to stabilize such aromatic amines by incorporating therein a small quantity of ether an aliphatic thioamide, an amino methane sulfinic acid compound or its tautomeric forms, such as, for example, N-propylamino methane sulfinic acid or a phosphorus sulfide reaction product of a phenolic compound, such as, for example, 2,6-di-tertiary-butyl 4-methyl phenol, tertiary butyl derivative of mixed cresols and mixture of ortho-, para- and meta-cresols. Inasmuch as all of these compounds and reaction products contain sulfur, their introduction into aromatic amines is highly undesirable since they function, even though slowly, as catalysts for the decomposition. Moreover, they are inoperative with certain types of aromatic amines and actually increase the susceptibility of such amines to oxidation.

It is an object of the present invention to provide a class of aromatic carbocyclic amines and polyamines which are stabilized against atmospheric oxidation and against deterioration during storage.

Another object is to provide a novel and improved method for stabilizing aromatic carbocyclic amines and polyamines.

Further objects and advantages will become more clearly manifest from the following description:

I have found that aromatic carbocyclic amines and polyamines can be very readily and efficiently stabilized against oxidation and deterioraiton by incorporating into said amine a stabilizing amount of a stannous halide characterized by the following general formula:

$$SnX_2$$

wherein X represents a halogen, i.e. bromide, chloride, iodide, and fluoride.

The foregoing stannous halides are very efficient stabilizers and anti-oxidants for aromatic amines and polyamines regardless whether they are in liquid or solid form. They effectively inhibit oxidation, and prevent deterioration when such amines and polyamines are stored or shipped. The amount to be employed will depend upon the particular aromatic amine or polyamine. This can be very readily determined by simple routine spot experiments. I have found, however, that in general, an amount ranging from about 0.01 part to 1.0 part by weight of any one of the aforementioned stannous halides is sufficient to stabilize 100 parts by weight of a liquid or solid aromatic amine or polyamine. The stannous halides are also effective in protecting aromatic amines and polyamines for long periods of time prior to their utilization as intermediates in chemical processes.

The aromatic amines and polyamines which may be effectively stabilized by the stannous halides, are those which are either liquid or solid at room temperature. The nature or character of the substituents in the aromatic nucleus is immaterial. The stannous halides are excellent anti-oxidants and stabilizers for all aromatic amines and polyamines even though they contain as substituents, acid groups such as carboxyl, sulfate, sulfonic acid groups, and the like. As examples of such amines and polyamines, the following are illustrative:

Aniline
Toluidine
o-, m-, p-Toluidine
Xylidine
o-, m-, p-Aminophenol
o-, m-, p-Phenylenediamines
Benzidine
α-Naphthylamine
β-Naphthylamine
o-, m-, p-Chloroaniline
2,4-toluenediamine
2,6-toluenediamine
Methylene-bis aniline
1-chloro-2,4-phenylenediamine
Diphenyl-3,3'-dimethoxy-4,4'-diamine
1,3-phenylenediamine
Naphthalene 1,4-diamine
Naphthalene 1,5-diamine
Xylylene diamine
4,4',4"-triphenyl methane triamine
2,4,6-triaminotoluene In order to more clearly illustrate the invention and to show the preferred mode of carrying the same into effect, and the advantages resulting therefrom, the following examples are given:

*Example I*

A 500 gram sample of meta-phenylenediamine was distilled through a short column condenser at 130° C. and 5 mm. pressure. The distillate was collected into two receivers, each containing approximately 240 ml. One receiver was identified as the control and the other contained 0.2 part by weight of stannous chloride, technical grade. Before releasing the vacuum both samples were melted (to dissolve the stannous chloride) and allowed to cool.

After 16 hours at 95° C. an aliquot of the control was reddish-brown in color. An aliquot of the stabilized material was only very slightly discolored.

At room temperature the control darkened in a few days, whereas the stabilized material remained unchanged in appearance even after two months.

*Example II*

A 500 gram sample of mixed tolylenediamines, consisting of 80% of 2,4- and 20% of 2,6-isomers was distilled and stabilized with stannous chloride in exactly the same manner as in Example I.

The control turned dark brown after 6 hours at 95° C. The stabilized material, containing 0.1 part by weight of stannous chloride, darkened only slightly at the surface and not at all in bulk after 6 hours at 95° C.

Example III

Freshly distilled ortho-toluidine was divided in two portions and one was stabilized by the addition of 0.1 part by weight of stannous chloride.

After 16 hours at 95° C. the control was red in color whereas the stabilized material remained a very pale yellow.

Example IV

To 100 grams of α-naphthylamine 0.1 part by weight of stannous fluoride was added and the mixture placed in a rotating ball mill for a period of one hour so as to evenly distribute stannous fluoride. The ground sample was then placed in an open glass vessel and allowed to remain at room temperature for a period of one week. A control sample was also allowed to stand at room temperature in an open glass vessel for the same period of time. The unstabilized sample, i.e. control, turned reddish, whereas the stabilized sample remained white.

Example V

Freshly distilled aniline was stabilized with 0.3 part by weight of stannous bromide. After one week at room temperature the sample was colorless, containing a white precipitate which could easily be filtered out. A control sample turned reddish-brown.

Example VI

Example IV was repeated with the exception that the α-naphthylamine was replaced by an equivalent amount of 2,4,6-triaminotoluene. The unstabilized sample, i.e. control turned color, whereas the stabilized sample remained unchanged.

Example VII

Example IV was again repeated with the exception that the α-naphthylamine was replaced by an equivalent amount of 3-aminophenol. The unstabilized sample, i.e. control turned color, whereas the stabilized sample remained unchanged.

Example VIII

Freshly distilled m-chloroaniline in which 0.1 part by weight of stannous chloride had been dissolved was irradiated together with an unstabilized control sample by an ultra-violet source. After one day the stabilized sample was virtually unchanged whereas the control was orange in color.

Example IX

Example I was repeated with the exception that the stannous chloride was replaced by an equivalent amount of stannous iodide.

From the foregoing examples, it becomes clearly manifest that the stabilized amines are free from the objectionable by-products and usable for various types of synthesis. During my experimentation I found that phenylenediamine stabilized in accordance with the foregoing examples gave a much paler-colored resin than an unstabilized phenylenediamine when both were employed as epoxy resin hardeners. In addition, a toluene diamine which had been stabilized and stored in air, instead of under nitrogen as had been previously necessary, still gave an excellent yield and quality of product when used as an intermediate for the preparation of isocyanates.

I claim:

1. A stabilized composition of matter consisting of a carbocyclic amine having 1 to 3 amino groups and selected from the class consisting of phenyl and naphthyl amines, said amine containing in 100 parts by weight thereof from 0.01 to 1.0 part by weight of a stannous halide.

2. A stabilized composition of matter according to claim 1, wherein the stannous halide is stannous chloride.

3. A stabilized composition of matter according to claim 1, wherein the stannous halide is stannous bromide.

4. A stabilized composition of matter according to claim 1, wherein the stannous halide is stannous iodide.

5. A stabilized composition of matter according to claim 1, wherein the stannous halide is stannous fluoride.

References Cited in the file of this patent

UNITED STATES PATENTS

| | | |
|---|---|---|
| 2,512,504 | Rogers | June 20, 1950 |
| 2,632,754 | Albert | Mar. 24, 1953 |
| 2,637,636 | Walters | May 5, 1953 |
| 2,645,613 | Adelson et al. | July 14, 1953 |

OTHER REFERENCES

Manabe et al.: Chemical Abstracts, vol. 48, page 10412b (1954), as abstracted from the Journal of the Chemical Society of Japan (Industrial Chemistry Section), vol. 56, pages 365–367 (1953).